(12) United States Patent
Li et al.

(10) Patent No.: US 12,339,541 B2
(45) Date of Patent: Jun. 24, 2025

(54) DISPLAY PANEL AND DISPLAY DEVICE

(71) Applicants: MIANYANG HKC OPTOELECTRONICS TECHNOLOGY CO., LTD, Mianyang (CN); HKC CORPORATION LIMITED, Shenzhen (CN)

(72) Inventors: Hui Li, Mianyang (CN); Haijiang Yuan, Mianyang (CN)

(73) Assignees: MIANYANG HKC OPTOELECTRONICS TECHNOLOGY CO., LTD, Mianyang (CN); HKC CORPORATION LIMITED, Shenzhen (CN)

( * ) Notice: Subject to any disclaimer, the term of this patent is extended or adjusted under 35 U.S.C. 154(b) by 145 days.

(21) Appl. No.: 18/082,530

(22) Filed: Dec. 15, 2022

(65) Prior Publication Data
US 2023/0213818 A1 Jul. 6, 2023

(30) Foreign Application Priority Data
Dec. 30, 2021 (CN) .......................... 202111653750.5

(51) Int. Cl.
*G02F 1/1339* (2006.01)
*G02F 1/1333* (2006.01)
(Continued)

(52) U.S. Cl.
CPC ...... *G02F 1/1339* (2013.01); *G02F 1/133357* (2021.01); *G02F 1/133514* (2013.01); *G02F 1/134363* (2013.01); *G02F 1/134372* (2021.01)

(58) Field of Classification Search
CPC ............ G02F 1/1339; G02F 1/133357; G02F 1/133514; G02F 1/134363;
(Continued)

(56) References Cited

U.S. PATENT DOCUMENTS 6,717,637 B1 * 4/2004 Yoon ................. G02F 1/133707
349/106
2002/0176043 A1 * 11/2002 Fukami ............. G02F 1/134363
349/141
(Continued)

FOREIGN PATENT DOCUMENTS

CN 101334561 A 12/2008
CN 101661178 A 3/2010
(Continued)

OTHER PUBLICATIONS

Cheng Zhang, the International Search Report, Feb. 2023, CN.
Cheng Zhang, the ISA written comments. Feb. 2023. CN.
Cheng Zhang, the International Search Report, Feb. 2023, CN.

*Primary Examiner* — Edmond C Lau
*Assistant Examiner* — Agnes Dobrowolski (57) ABSTRACT

A display panel and a display device are disclosed. The display panel includes a first substrate, a second substrate, and a spacer. The first substrate includes a substrate, a signal line, a planarization layer, and an electrode layer. The electrode layer is arranged on the planarization layer and is located in the pixel regions. The electrode layer includes at least a trunk and a plurality of branches. The plurality of branches are disposed at intervals and connected to the trunk. A groove is defined in the planarization layer in a region adjacent to the spacer. The groove corresponds to the electrode layer, so that the portion of the electrode layer in the region adjacent to the spacer is embedded in the groove.

15 Claims, 5 Drawing Sheets

(51) Int. Cl.
*G02F 1/1335* (2006.01)
*G02F 1/1343* (2006.01)

(58) Field of Classification Search
CPC ......... G02F 1/134372; G02F 1/134309; G02F 1/13394; G02F 1/136286
See application file for complete search history.

(56) References Cited

U.S. PATENT DOCUMENTS

2014/0028954 A1* 1/2014 Shibazaki ......... G02F 1/134363 349/110
2017/0176803 A1* 6/2017 Sonoda ............... G02F 1/13439

FOREIGN PATENT DOCUMENTS

| | | | |
|---|---|---|---|
| CN | 102162960 | A | 8/2011 |
| CN | 103424945 | A | 12/2013 |
| CN | 103487997 | A | 1/2014 |
| CN | 104280950 | A | 1/2015 |
| CN | 205787496 | U | 12/2016 |
| CN | 106773365 | A | 5/2017 |
| CN | 107479258 | A | 12/2017 |
| CN | 107703683 | A | 2/2018 |
| CN | 206975366 | U | 2/2018 |
| CN | 109254448 | A | 1/2019 |
| CN | 109870855 | A | 6/2019 |
| CN | 113589597 | A | 11/2021 |
| CN | 113703229 | A | 11/2021 |
| CN | 215117092 | U | 12/2021 |
| CN | 114217481 | A | 3/2022 |
| JP | 2017037131 | A | 2/2017 |
| KR | 20080014679 | A | 2/2008 |
| KR | 20130068558 | * | 6/2013 |
| KR | 20130068558 | A | 6/2013 |
| KR | 20140098401 | A | 8/2014 |
| KR | 20150076348 | A | 7/2015 |
| KR | 20170064067 | A | 6/2017 |

* cited by examiner

DISPLAY PANEL AND DISPLAY DEVICE

CROSS-REFERENCE TO RELATED APPLICATIONS

This application claims the priority and benefit of Chinese patent application 2021116537505, titled "Display Panel and Display Device" and filed Dec. 30, 2021, with China National Intellectual Property Administration, the entire contents of which are incorporated herein by reference.

TECHNICAL FIELD

This application relates to the field of display technology, and more particularly relates to a display panel and a display device.

BACKGROUND

An existing liquid crystal display panel is usually composed of an array substrate, a color filter substrate, and a liquid crystal layer sandwiched between the array substrate and the color filter substrate. The array substrate is also provided with circuit wiring for controlling the rotation of the liquid crystal, such as a pixel electrode. The pixel electrode is located in the display region and usually made of a transparent conductive indium tin oxide (ITO) material. It has the advantage of high transmittance, but it is brittle and prone to cracks under the action of external forces. A spacer is also arranged between the array substrate and the color filter to maintain a stable cell thickness between the two substrates. Under normal circumstances, the spacer will not be in contact with the pixel electrode. However, under the action of an external force, the spacer will slide. Then it invades the edge of the display area, and will contact the pixel electrode, which will cause compressive stress to the pixel electrode, causing fracture, making the display panel drive abnormally, causing display failure, causing customer damage, and affecting the company's reputation.

Therefore, it is an urgent problem to be solved to prevent the pixel electrode from being broken under pressure due to the sliding of the spacer, resulting in abnormal driving and display failure.

SUMMARY

In view of the above, it is therefore a purpose of the present application to provide a display panel and a display device, whereby by arranging the electrode layer adjacent to the scanning line or the data line in a groove, the driving abnormality caused by the pressure fracture of the electrode layer when the spacer slides is avoided, and the stability of the display panel is improved.

The present application discloses a display panel. The display panel includes a first substrate, a second substrate and a spacer. The first substrate and the second substrate are aligned and bonded together to form a cell. The spacer is located between the first substrate and the second substrate. The first substrate includes a substrate, a signal line, a planarization layer and an electrode layer. The signal line is disposed on the substrate. A plurality of the signal lines are arranged, and the plurality of signal lines are arranged in a crisscross pattern to form a plurality of pixel regions. The planarization layer is disposed on the signal lines. One end of the spacer is arranged on the second substrate, and the other end abuts on the planarization layer. The electrode layer is arranged on the planarization layer and is located in the pixel region. The electrode layer includes at least a trunk and a plurality of branches. The plurality of branches are arranged at intervals and connected to the trunk. The region of the planarization layer adjacent to the spacer is provided with a groove. The groove corresponds to the electrode layer, so that the electrode layer in the region adjacent to the spacer is embedded in the groove.

Optionally, the opening width of the groove is smaller than the cross-sectional width of the spacer.

Optionally, the first substrate further includes a color filter layer, and the color filter layer is disposed between the substrate and the planarization layer, corresponding to the position of the pixel region. The color filter layer includes a variety of color filters of different colors. The color filter layer includes at least a first color filter. The thickness of the first color filter near the signal line is greater than the thickness far from the signal line. The groove includes a first groove, and the first groove corresponds to the edge position of the first color filter. The electrode layer is disposed in the first groove.

Optionally, the display panel is a fringe field switch technology display panel. The display panel further includes a conductive layer. The conductive layer is disposed between the substrate and the signal line. The conductive layer is an integral continuous surface electrode and forms a fringe electric field with the electrode layer. The groove is disposed corresponding to the position of the electrode layer adjacent to the signal line, so as to accommodate the portion of the electrode layer adjacent to the signal line.

Optionally, the display panel is of an in-plane switching type. The electrode layer includes a pixel electrode and a common electrode. The pixel electrode includes a first trunk and a plurality of first branches, and the plurality of first branches are arranged at intervals and connected with the first trunk in a comb-like structure. The common electrode includes a second trunk and a plurality of second branches, the plurality of second branches are arranged at intervals, and are connected with the second trunk in a comb-like structure. The pixel electrode and the common electrode are arranged opposite to each other. The plurality of first branches and the plurality of second branches are alternately arranged to form a horizontal electric field. The groove is disposed corresponding to the position of the electrode layer adjacent to the signal line, so as to accommodate the portion of the pixel electrode and/or the common electrode adjacent to the signal line.

Optionally, the signal line includes a data line. The data line is arranged along a first direction. The groove includes at least one first elongated groove. The first elongated groove extends along the first direction. At least one of the first branch or the second branch is arranged in the first elongated groove.

Optionally, the signal lines include a scan line. The scan line is arranged along a second direction. The groove includes at least one second elongated groove. The second elongated groove extends along the second direction. The first trunk or the second trunk is arranged in the second elongated groove.

Optionally, the display panel is of a vertical alignment type. The trunk is in the shape of a square tetracube. The trunk includes a horizontal portion arranged in a horizontal orientation and a vertical portion arranged in a vertical orientation. One end of each of the plurality of branches is connected with the horizontal portion and/or the vertical portion, and the other ends of the plurality of branches extend in different directions to form a plurality of domains.

The groove includes a square annular shape. At least an edge of the trunk is arranged in the square annular shape.

Optionally, the first substrate is an array substrate, and the second substrate is a color filter substrate. The groove includes a second groove, and a groove wall on the side of the second groove adjacent to the signal line is perpendicular to the array substrate. The groove wall on the side of the second groove away from the signal line is arranged as an inclined surface or a stepped surface, and the electrode layer is set in the second groove.

The present application further discloses a display device including a backlight module. The display device further includes any one of the display panels disclosed in this application. The backlight module is arranged on a side away from a light emitting surface of the display panel.

Compared with the solution in which the spacer slides causing the pixel electrode to be broken due to pressure and resulting in abnormal driving, in the present application, a groove is defined in the position of the planarization layer near the signal line, and the electrode layer is arranged in the groove to prevent the spacer from sliding by an external force and sliding toward the display area thereby scratching the electrode layer. Since the electrode layer is disposed in the groove, and when the thickness of the electrode layer is equal to the depth of the groove, the upper surface of the electrode layer and the upper surface of the planarization layer lie on the same plane. In this way, when the spacer slides, it only contacts the upper surface of the conductive layer. Even if the upper surface of the electrode layer is worn under pressure, the electrode layer in the groove can still be normally conductive, preventing abnormal driving of the display panel. Alternatively, when the thickness of the electrode layer is smaller than the depth of the groove, the upper surface of the electrode layer is lower than the upper surface of the planarization layer, then the groove can not only prevent the electrode layer from being broken due to being pressed, but also prevent the spacer from sliding further, thereby preventing the electrode layer from being damaged by pressure at other positions, enhancing the stability of the display panel.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. Term "comprising", "including", and any variants thereof mean non-exclusive inclusion, so that one or more other features, integers, steps, operations, units, components, and/or combinations thereof may be present or added.

In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Furthermore, as used herein, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood depending on specific contexts.

Hereinafter this application will be described in further detail with reference to the accompanying drawings and some optional embodiments.

Figure 1:
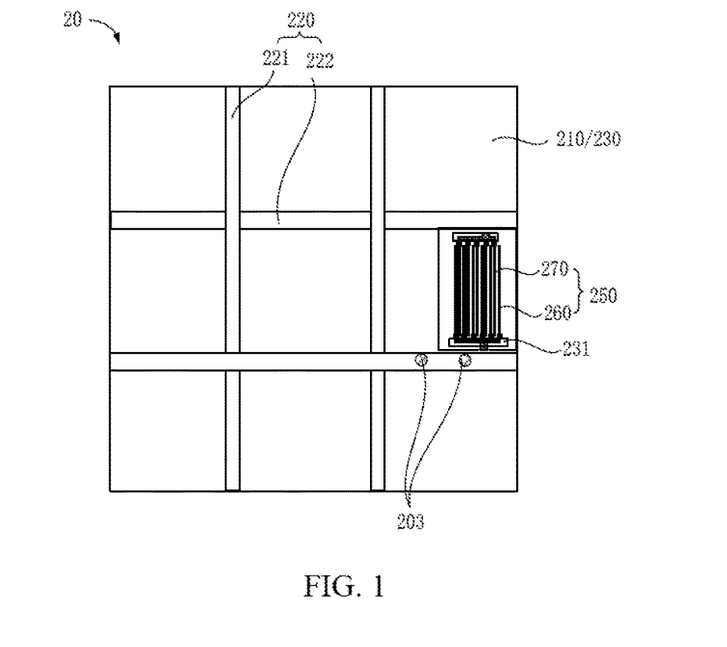
FIG. 1 is a schematic top view of a display panel according to a first embodiment of the present application.
Figure 2:
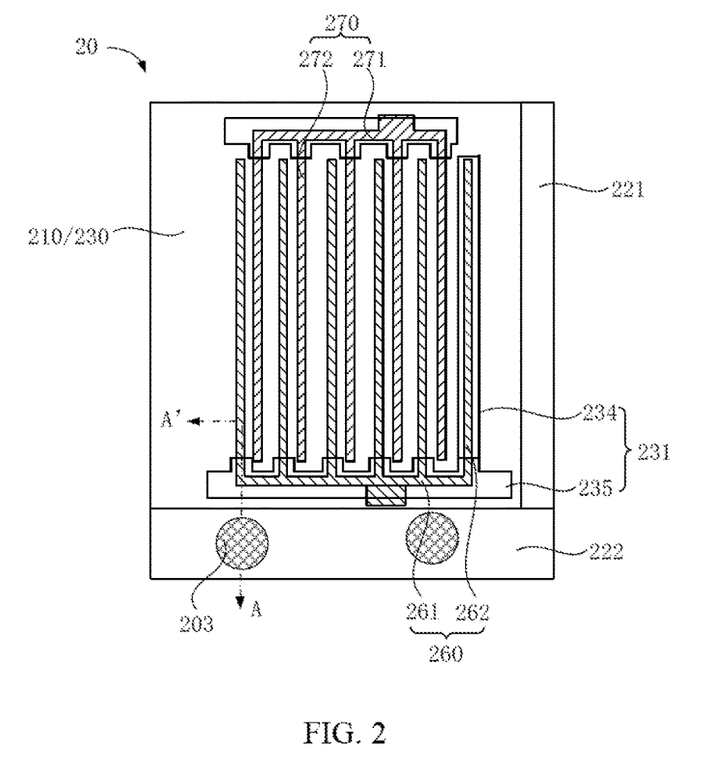
FIG. 2 is a schematic top view of an electrode layer according to the first embodiment of the present application.
Figure 3:
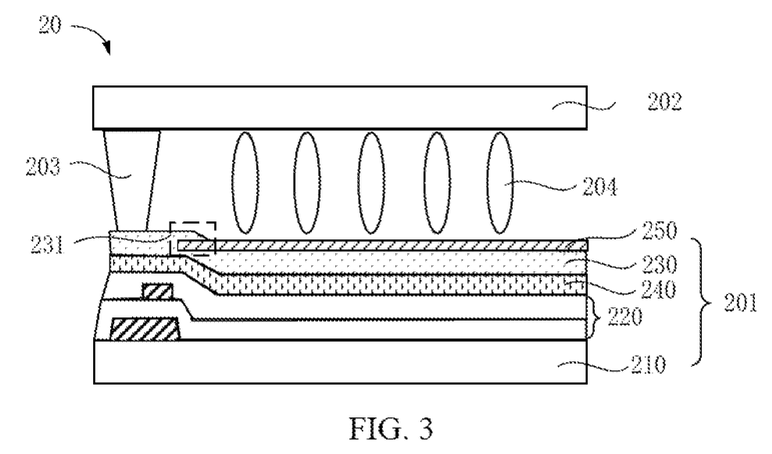
FIG. 3 is a schematic cross-sectional view taken along line A-A' of FIG. 2.

FIG. 1 is a schematic top view of a display panel according to a first embodiment of the present application. FIG. 2 is a schematic top view of an electrode layer according to a second embodiment of the present application. FIG. 3 is a schematic cross-sectional view taken along line A-A' of FIG. 2. Referring to FIGS. 1-3, the present application discloses a display panel 20. The display panel 20 includes a first substrate 201, a second substrate 202, and a spacers 203. The first substrate 201 and the second substrate 202 are aligned and bonded together to form a cell. The spacer 203 is disposed between the first substrate 201 and the second substrate 202. The first substrate 201 includes a substrate 210, signal lines 220, a planarization layer 230, and an electrode layer 250. The signal lines 220 are disposed on the substrate 210. A plurality of signal lines 220 are provided, and the plurality of signal lines 220 are arranged in a crisscross pattern to form a plurality of pixel regions. The planarization layer 230 is disposed on the signal lines 220. One end of the spacer 203 is disposed on the second substrate 202, and the other end abuts on the planarization layer 230. The electrode layer 250 is disposed on the planarization layer 230 and is located in the pixel region. The electrode layer 250 includes at least a trunk 251 and a plurality of branches 252. The plurality of branches 252 are arranged at intervals and connected to the trunk 251. The planarization layer 230 is provided with a groove 231 in the region adjacent to the spacer 203, and the groove 231 corresponds to the electrode layer 250, so that the electrode layer 250 in the region adjacent to the spacer 203 is embedded in the groove 231.

Compared with the solution in which the spacer 203 slides causing the pixel electrode 260 to be broken due to pressure and resulting in abnormal driving, in the present application, a groove 231 is defined in the position of the planarization layer 230 near the signal line 220, and the electrode layer 250 is arranged in the groove 231 to prevent the spacer 203 from sliding by an external force and sliding toward the display area thereby scratching the electrode layer 250. Since the electrode layer 250 is disposed in the groove 231, and when the thickness of the electrode layer 250 is equal to the depth of the groove 231, the upper surface of the electrode layer 250 and the upper surface of the planarization layer 230 lie on the same plane. In this way, when the spacer 203 slides, it only contacts the upper surface of the conductive layer 250. Even if the upper surface of the electrode layer 250 is worn under pressure, the electrode layer 250 in the groove 231 can still be normally conductive, preventing abnormal driving of the display panel 20. Alternatively, when the thickness of the electrode layer 250 is smaller than the depth of the groove 231, the upper surface of the electrode layer 250 is lower than the upper surface of the planarization layer 230, then the groove 231 can not only prevent the electrode layer 250 from being broken due to being pressed, but also prevent the spacer 203 from sliding further, thereby preventing the electrode layer 250 from being damaged by pressure at other positions, enhancing the stability of the display panel 20.

In this application, the display panel 20 is used as a liquid crystal display panel 20, and a liquid crystal layer 204 is further disposed between the first substrate 201 and the second substrate 202. Driving electrodes are formed between the first substrate 201 and the second substrate 202 to control the rotation of the liquid crystal molecules, so that the display panel 20 displays an image. A spacer 203 is further provided between the first substrate 201 and the second substrate 202. Usually, the spacer 203 is arranged at a position corresponding to the signal line 220 to support the panel and maintain the thickness of the box. However, when the display panel 20 is subjected to an external force or a stress test is performed, the spacer 203 will slide toward the pixel region due to the force. In the present application, a groove 231 is provided in the planarization layer 230 corresponding to position adjacent to the signal line 220. In addition, corresponding to the position of the groove 231, the thickness of the electrode layer 250 is less than or equal to the depth of the groove 231. The electrode layer 250 is arranged in the groove 231 to prevent the spacer 203 from breaking thereby causing abnormal driving and display failure.

Preferably, corresponding to the position of the groove 231, the depth of the groove 231 is larger than the thickness of the electrode layer 250 by 0.1 um~0.5 um. The depth of the groove 231 is set to be greater than the thickness of the electrode layer 250, and the difference between the depth of the groove 231 and the thickness of the electrode layer 250 at the position near the signal line 220 is in the range of 0.1 μm to 0.5 μm. In this embodiment, the depth of the groove 231 is set to be greater than the thickness of the electrode layer 250, so that the upper surface of the electrode layer 250 located in the groove 231 is lower than the upper surface of the planarization layer 230 at the groove opening. Furthermore, when the display panel 20 is normally assembled, the upper surface of the electrode layer 250 near the signal line 220 is lower than the upper surface of the planarization layer 230. Therefore, even if the spacer 203 slides, it will not contact the upper surface of the electrode layer 250, so that the electrode layer 250 will not be broken by the pressure of the spacer 203, and the electrode layer 250 will not be scratched or worn out, which further improves the Stability of the display panel 20.

Furthermore, the opening width of the groove 231 is smaller than the cross-sectional width of the spacer 203. Even if the spacer 203 slides under force, it will not fall into the groove 231, and will not contact the electrode layer 250, thereby preventing the electrode layer 250 from being broken under pressure. The groove 231 is generally arranged in a strip shape, and the electrode layer 250 near the signal line 220 is all arranged in the groove 231. Since the force acted on the display panel 20 is random, and the sliding direction of the spacer 203 is also random, in order to avoid the problem of the electrode layer 250 being broken under pressure, in this embodiment, the electrode layer 250 adjacent to the spacer 203 area is all arranged in the groove 231, no matter which direction the spacer 203 slides along the signal line 220, the damage to the electrode layer 250 can be avoided. Furthermore, the groove 231 is strip-shaped and have a certain guiding function, so that when the spacer 203 slides, it will slide along the extending direction of the groove 231, that is, slide in a direction parallel to the signal line 220, so as to prevent the spacer 203 from sliding into the pixel region and further avoid the problem of abnormal driving caused by damage to the electrode layer 250.

Generally, the region where the groove 231 is provided is within a width range of about 20 um near the signal line 220, which prevents the electrode layer 250 from being scratched and does not affect the topography of the central area of the pixel region Furthermore.

Take the display panel 20 being an in-plane switching type (IPS) display panel as an example. The electrode layer 250 includes a pixel electrode 260 and a common electrode 270. The pixel electrode 260 includes a first trunk 261 and a plurality of first branches 262. The plurality of first branches 262 are arranged at intervals and connected to the first trunk 261 in a comb-like structure. The common electrode 270 includes a second trunk 271 and a plurality of second branches 272. The plurality of second branches 272 are arranged at intervals and connected to the second trunk 271 in a comb-like structure. The pixel electrode 260 and the common electrode 270 are arranged opposite to each other. The plurality of first branches 262 and the plurality of second branches 272 are alternately arranged to form a horizontal electric field. The groove 231 is disposed corresponding to the position of the electrode layer 250 adjacent to the signal line 220 to accommodate the portion of the pixel electrode 260 and/or the common electrode 270 adjacent to the signal line 220.

In this embodiment, it is used as an example where the plurality of branches 252 are perpendicular to the trunk 251 to form a comb-shaped structure in which the plurality of branches 252 are parallel to each other, and where the pixel electrode 260 and the common electrode 270 are both comb-like structures that are parallel to each other to form a horizontal electric field.

Specifically, the signal lines 220 includes a data line 221. The data line 221 is arranged along a first direction. The groove 221 includes at least one first elongated groove 232, the first elongated groove 232 extends along the first direction, and where at least one first branch 262 or second branch 272 is disposed in the first elongated groove 234. Furthermore, the signal line 220 further includes a scan line 222. The scan line 222 is arranged along the second direction. The groove 231 includes at least one second elongated groove 235. The second elongated groove 235 extends along a second direction. The first trunk 261 or the second trunk 271 is arranged in the second elongated groove 235. The first direction is perpendicular to the second direction, where the first direction is a vertical orientation, and the second direction is a horizontal orientation.

As shown in FIG. 2, the pixel electrode 260 and the common electrode 270 are both comb-shaped, and each have a trunk 251 and a plurality of branches 252. The present application also makes some design on the shape of the groove 231, so that the groove 231 matches the shape of the pixel electrode 260 and the common electrode 270. The groove 231 includes at least one first elongated groove 234, the first elongated groove 234 extends along a first direction, and the first direction is a direction parallel to the data line 221. The first elongated groove 234 is an elongated strip structure, and the first branch 262 or the second branch 272 near the data line 221 is disposed in the first elongated groove 234 to prevent the electrode layer 250 from being scratched when the spacer 203 disposed corresponding to the data line 221 slides.

Furthermore, the groove further includes a second elongated groove 235, and the second elongated groove 235 extends along a second direction, which is a direction parallel to the scan line 222. The second elongated groove 235 includes an elongated main groove. Furthermore, a plurality of sub-grooves are provided along the direction of the first branches 262 or the second branches 272. The length of the sub-groove is set in the range of 5 um~15 um, and only portions of the branches 252 adjacent to the trunk 251 are arranged in the sub-grooves. Furthermore, the widths of the main groove and the sub-grooves are both set to be smaller than the cross-sectional width of the spacer 203. The first trunk 261 or the second trunk 271 and portions of the first branches 262 or the second branches 272 are all arranged in the second elongated groove 235. When the spacer 203 slides to the position of the groove, the groove 231 supports the spacer 203 which thus will not sink into the groove 231, and so the electrode layer 250 in the groove 231 will not be damaged even more surely. Of course, the second elongated groove 235 can also be a rectangular groove, and the first trunk 261 (or the second trunk 271) and the portions of the first branches 262 near the first trunk 261 (or the portions of the second branches 272 near the second trunk 271) are all arranged in the rectangular groove.

In addition, the present application also makes a certain design for the width of the groove 231. Specifically, at the position corresponding to the groove 231, the opening width of the groove 231 along the extending direction of the signal lines is set to be greater than the width of the electrode layer 250, and the difference between the width of the groove 231 and the width of the electrode layer 250 lies in the range of 2 um~15 um. That is, the difference between the opening width of the main groove and the width of the first trunk 261 along the vertical orientation is 2 um~15 um, so that when the pixel electrode 260 and the common electrode 270 are located in the groove 231, a gap is also formed between the electrode layer 250 and the groove wall of the groove 231. Setting the gap can offset errors in the manufacturing process, and prevent the pixel electrode 260 and/or the common electrode 270 from being too wide to be completely arranged in the groove 231. Otherwise, the material for making the pixel electrode 260 and/or the common electrode 270 is accumulated at the opening position of the groove 231, resulting in uneven thickness, thereby causing uneven electric field and uneven image quality.

Specifically, the first substrate 201 further includes a color filter layer 240. The color filter layer 240 is disposed between the substrate 210 and the planarization layer 230, corresponding to the position of the pixel region. The color filter layer 240 includes a variety of color filters of different colors. The color filter layer 240 includes at least a first color filter. The thickness of the first color filter near the signal line 220 is greater than the thickness at the position far away from the signal line 220. The groove 231 includes the first groove 232. The first groove 232 corresponds to the edge position of the first color filter, and the electrode layer 250 is disposed in the first groove 232.

In this embodiment, the first substrate 201 is further provided with a color filter layer 240. That is, the first substrate 201 is a COA substrate, and the second substrate 202 is a counter substrate. The counter substrate may be a glass substrate. During the manufacture of the COA substrate, the color filter layer 240 is formed by a variety of color filters of different colors, usually including red (R), green (G) and blue (B) color filter. Therefore, at least three processes are required. Due to the leveling property of the color filter material, the color filter will have uneven thickness. That is, the thickness of the color filter at the position adjacent to the signal line 220 is greater than that at other positions, showing a "concave structure" with a lower middle and higher sides. At this time, when the planarization layer 230 is formed on the color filter layer 240, the planarization layer 230 also exhibits a concave shape corresponding to the concave position, so that the upper surface of the planarization layer 230 is uneven. In this way, the electrode layer 250 at the concave position is equivalent to being disposed on a slope. Especially for the color filter that is produced in the last step, the concave degree is more serious. Therefore, in this embodiment, the groove 231 is only provided in the color filter produced last.

Take the last produced color filter as the first color filter as an example. Usually the first color filter is a B color filter, and can also be an R color filter or a G color filter. The groove 231 includes a first groove 232. The first groove 232 corresponds to the edge position of the first color filter and is disposed adjacent to the position of the signal line 220. The electrode layer 250 corresponding to the position of the first color filter is arranged in the first groove 232 to avoid the problem of pressure fracture or surface damage to the electrode layer 250 at the position of the first color filter. In addition, the first groove 232 is disposed at a position where the first color filter is adjacent to the signal line 220, that is, the first groove 232 is defined at a position where the two sides of the first color filter have a concave structure. At this time, the position of the electrode layer 250 adjacent to the signal line 220 is disposed in the first groove 232. It is equivalent to lowering the position of the electrode layer 250, which is also beneficial for the upper surface of the position of the electrode layer 250 near the signal line 220 to be flush with the upper surface of other positions, or to be adjacent to the flush state, and it is also beneficial to improve the electric field stability of the display panel 20.

Preferably, the electrode layers 250 near the signal lines 230 are all disposed in the first grooves 232. That is, the first groove 232 may include a first elongated groove 234 and/or a second elongated groove 235, and the first trunk 261 or the second trunk 271 near the scan line 222 is arranged in the second elongated groove 235, and/or the first branch 262 or the second branch 272 adjacent to the data line 221 is disposed in the first elongated groove 234 to prevent the spacer 203 from scratching the electrode layer 250 to improve the stability of the display panel 20. At this time, the display panel 20 can also bear more pressure, which is especially suitable for an outdoor screen or a touch screen.

In actual production, when the groove 231 is formed in the planarization layer 230, a halftone mask process or an ashing process can be used to form the groove 231, so that the planarization layer 230 is thinner corresponding to the position adjacent to the signal line 220. Of course, the thickness of the planarization layer 230 may also be uniform, and the groove 231 may also be formed in other film layers on the first substrate 201, so that the planarization layer 230 is embedded therein to form the groove 231.

In practical applications, the spacer 203 is usually farther away from the electrode layer 250 near the data line 221. When the spacer 203 slides, it usually does not contact the electrode layer 250. Therefore, the first elongated groove 234 may not be provided at the position adjacent to the data line 221, that is, the first elongated groove 234 is usually only provided at the position adjacent to the scan line 222. Alternatively, the first elongated groove 234 and/or the second elongated groove 235 may be set depending on the actual pressure of the display panel 20 to make the display panel 20 more adaptable.

Embodiment 2

Figure 4:
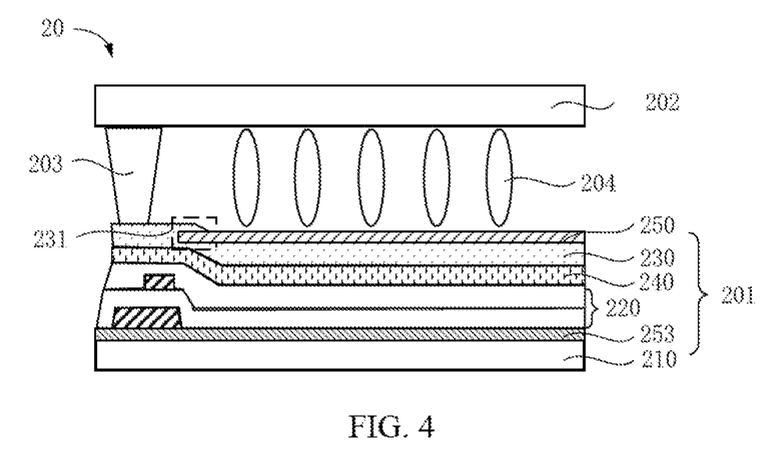
FIG. 4 is a schematic cross-sectional view of a display panel according to the second embodiment of the present application.

FIG. 4 is a schematic cross-sectional view of a display panel according to a second embodiment of the present application. Referring to FIG. 4, different from the first embodiment, the display panel 20 is a fringe field switching (FPS) display panel. The display panel 20 further includes a conductive layer 253 disposed between the substrate 210 and the signal lines 220. The conductive layer 253 is an integral continuous electrode and forms a fringe electric field with the electrode layer 250. The groove 231 is disposed corresponding to the position of the electrode layer 250 adjacent to the signal line 220 to accommodate the portion of the electrode layer 250 adjacent to the signal line 220.

In this embodiment, the display panel 20 is an FPS display panel, and the electrode layer 250 and the conductive layer 253 form a fringe electric field to drive the liquid crystal to rotate, so that the display panel 20 displays a picture. Furthermore, the electrode layer 250 and the conductive layer 253 are located in different layers. The groove 231 is provided at a position corresponding to the electrode layer 250 adjacent to the signal line 220, so that the portion of the electrode layer 250 adjacent to the signal line 220 is arranged in the groove 231 to prevent the abnormal driving phenomenon caused by scratching the electrode layer 250 when the spacer 203 slides, so as to avoid abnormal display and improve the stability of the display panel 20. The electrode layer 250 may be a pixel electrode (or a common electrode), and the conductive layer 253 may be a common electrode (or a pixel electrode) to form a fringing electric field.

Embodiment 3

Figure 5:
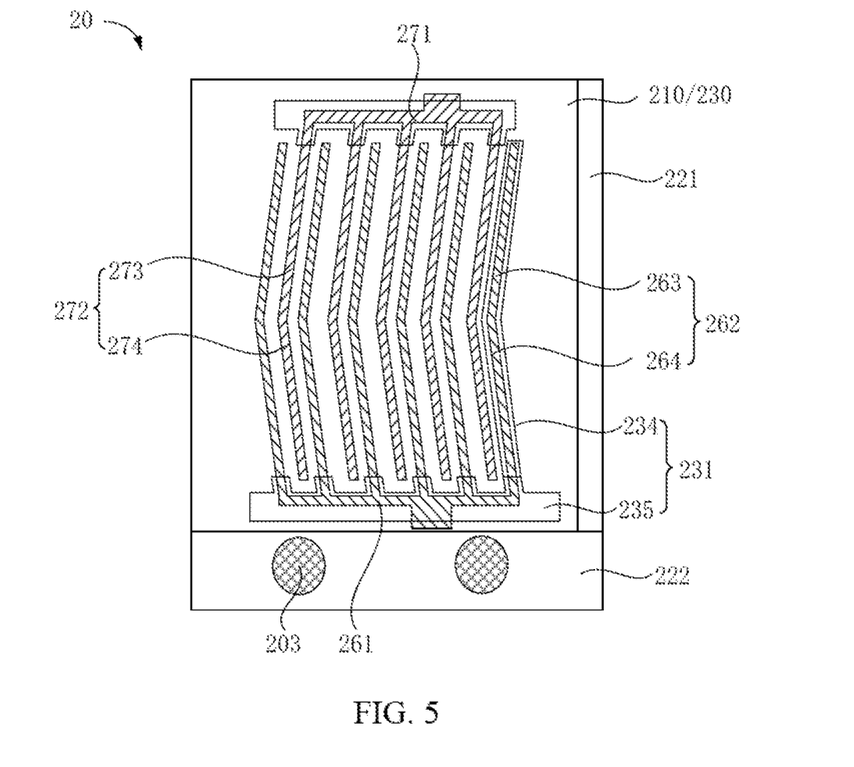
FIG. 5 is a schematic top view of a display panel according to a third embodiment of the present application.

FIG. 5 is a schematic top view of a display panel according to a third embodiment of the present application. Referring to FIG. 5, different from the first embodiment, in the pixel electrode 260 and the common electrode 270, each first branch 262 includes a first sub-branch 263 and a second sub-branch 264. One end of the first sub-branch 263 is connected to the first trunk 261 and the other end is connected to the second sub-branch 264, and the first sub-branch 263 and the second sub-branch 264 are arranged at a first obtuse angle. Each second branch 272 includes a third sub-branch 273 and a fourth sub-branch 274. One end of the third sub-branch 273 is connected to the second trunk 271, and the other end is connected to the fourth sub-branch 274, and the third sub-branch 273 and the fourth sub-branch 274 are arranged at a second obtuse angle. The first obtuse angle is equal to the second obtuse angle, and the first obtuse angle is set to take a value that lies in the range of 150°~166°.

In this embodiment, for each comb-shaped pixel electrode 260 and common electrode 270, each branch 252 includes a first sub-branch 263 and a second sub-branch 264. Both ends of the first sub-branch 263 are respectively connected to the trunk 251 and the second sub-branch 264, and the included angle between the first sub-branch 263 and the second sub-branch 264 is an obtuse angle, showing a V-shaped structure. That is, both the pixel electrode 260 and the common electrode 270 have a V-shaped comb structure, and the obtuse angle in the V-shaped structure is 150°~166°. Within this range, the stability of the electric field and the driving effect of the liquid crystal are satisfactory. Furthermore, corresponding to the shape of the pixel electrode 260 and the common electrode 270, the structure of the groove 231 is correspondingly arranged, that is, near the data line 221, when the groove 231 is the first elongated groove 234, the first elongated groove 234 is composed of two elongated grooves, and the angle between the two elongated grooves is set to 150°~166° that matches the shape of the branch 252. Alternatively or additionally, near the scan line 222, when the groove 231 is the second elongated groove 235, and the second elongated groove 235 includes a main groove and a plurality of sub-grooves, there is also a certain angle between the sub-grooves and the main groove, so that the portions of the electrode layer 250 near the signal line 220 is all disposed in the groove 231, and the effect of preventing the electrode layer 250 from being scratched is satisfactory.

Embodiment 4

Figure 6:
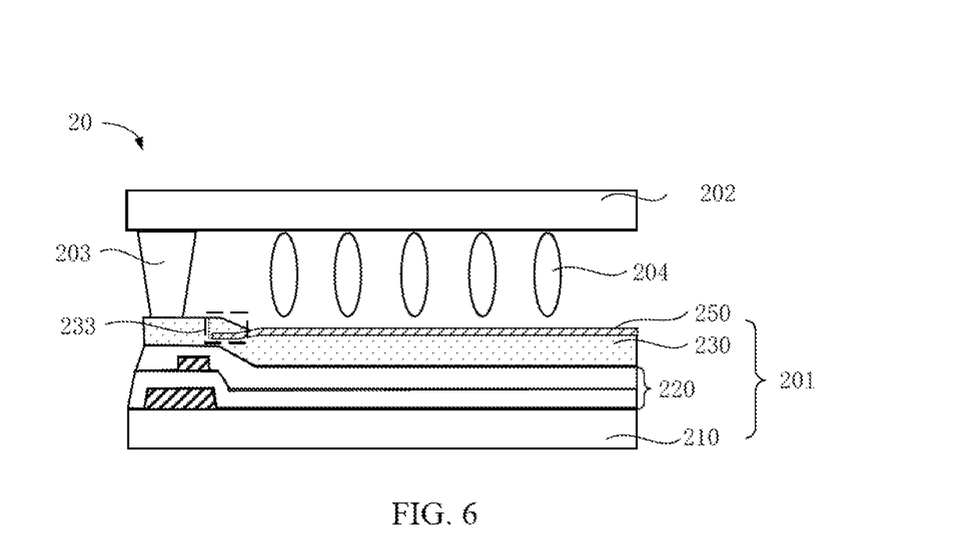
FIG. 6 is a schematic cross-sectional view of a display panel according to a fourth embodiment of the present application.
Figure 7:
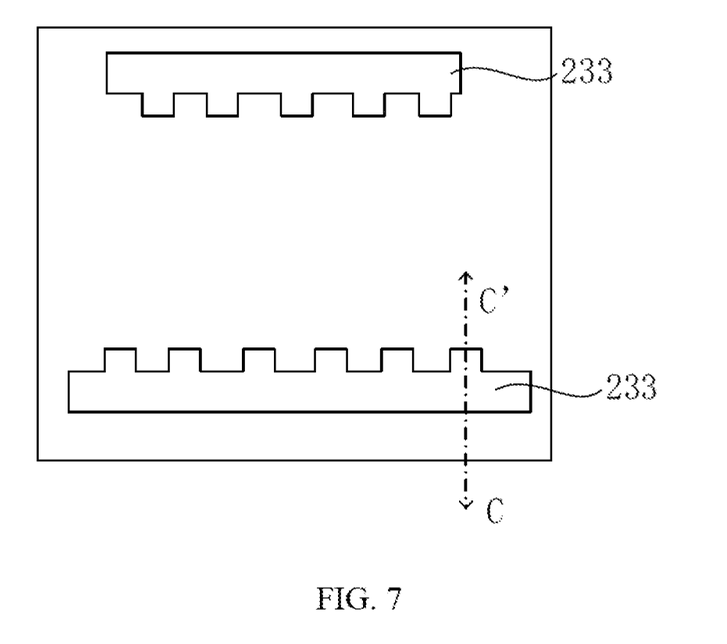
FIG. 7 is a schematic plan view of a groove in the fourth embodiment of the present application.
Figure 8:
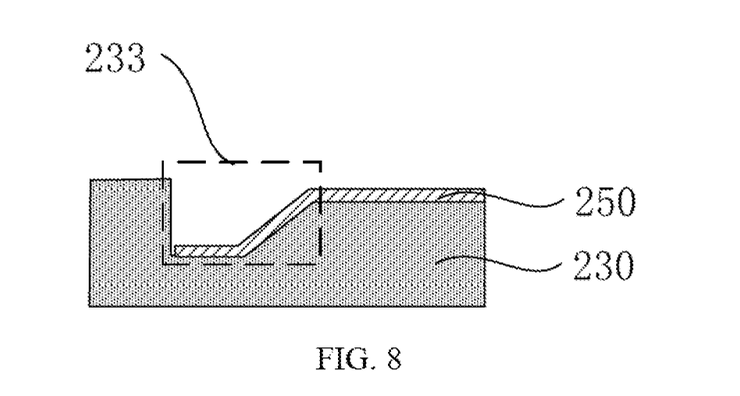
FIG. 8 is a schematic cross-sectional view taken along line C-C' direction in FIG. 7.

FIG. 6 is a schematic cross-sectional view of a display panel according to a fourth embodiment of the present application. FIG. 7 is a schematic plan view of a groove in the fourth embodiment of the present application. FIG. 8 is a schematic cross-sectional view taken along line C-C' direction in FIG. 7. As illustrated in FIGS. 7-9, the first substrate 201 is an array substrate, and the second substrate 202 is a color filter substrate. The groove 231 includes a second groove 233, and a groove wall of the second groove 233 on the side adjacent to the signal line 220 is perpendicular to the array substrate. The groove wall on the side of the second groove 233 away from the signal line 220 is set as a sloped surface or a stepped surface, and the electrode layer 250 is set in the second groove 233.

In this embodiment, the first substrate 201 is an array substrate, and the second substrate 202 is a color filter substrate. The planarization layer 230 on the array substrate may also be a passivation layer, that is, the groove 231 is formed in the passivation layer. At this time, the color filter layer 240 may be fabricated on the color filter substrate. The passivation layer generally does not have the problem of uneven thickness or uneven top surface of the passivation layer. Therefore, the groove 231 includes the second groove 233. The second groove 233 may be formed in the passivation layer. Taking the display panel 20 being an IPS type display panel 20 as an example, the electrode layer 250 includes a pixel electrode 260 and a common electrode 270 which are arranged in a comb-like structure and are mutually interdigitated. The second groove 233 is disposed adjacent to the signal line 220. The second groove 233 may also include the first elongated groove 234 or the second elongated groove 235. The first trunk 261 and the second trunk 271 are disposed in the second groove 233, or the first branch 262 or the second branch 272 is disposed in the second groove 233. In addition, the groove wall of the second groove 233 near the signal line 220 is a vertical plane parallel to the direction from the array substrate to the color filter substrate, and the groove wall on the side away from the signal line 220 is a sloped or stepped surface.

In this embodiment, the slope is taken as an example. The inclined surface may only be provided in the second groove 233, corresponding to the side wall where the trunk 251 and the branch 252 are connected, and where the trunk 251 extends to the branch 252, so as to prevent the disconnection of the branch 252 or the disconnection between the branch 252 and the trunk 251, and so the stability of the display panel 20 is improved. Of course, when the electrode layer 250 is a whole-layer structure, the second groove 233 is only provided at a position adjacent to the signal line 220, and the second groove 233 is strip-shaped. The groove wall on the side of the second groove 233 away from the signal line 220 is set as an inclined surface, which prevents the electrode layer 250 from being scratched by the spacer 203 causing the electrode layer 250 to be broken, and also prevents the electrode layer 250 from being disconnected.

Embodiment 5

Figure 9:
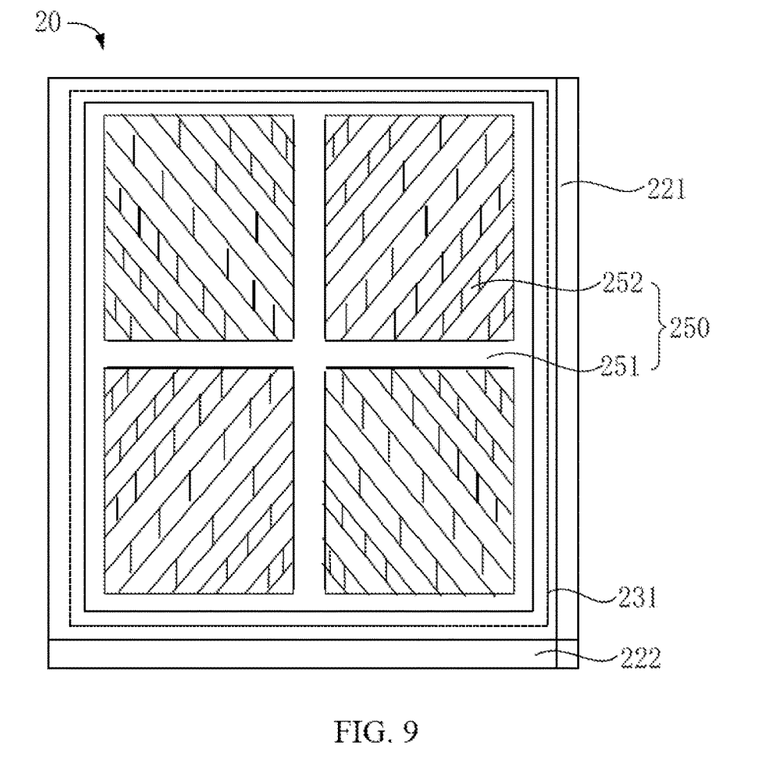
FIG. 9 is a schematic top view of a display panel according to a fifth embodiment of the present application.

FIG. 9 is a schematic top view of a display panel according to a fifth embodiment of the present application. Referring to FIG. 9, as the fifth embodiment of the present application, the display panel 20 is a vertical alignment type (VA). The trunk 251 is in the shape of a square tetracube, and the trunk 251 includes a horizontal portion arranged in a horizontal orientation and a vertical portion arranged in a vertical orientation. One end of each of the plurality of branches 252 is connected with the horizontal portion and/or the vertical portion, and the other end extends in different directions to form a plurality of domains. The groove 231 includes a right-angled annular groove, and at least an edge of the trunk 251 is disposed in the annular groove.

In this embodiment, the display panel 20 is a VA-type display panel 20. The first substrate 201 may be an array substrate, and the second substrate 202 may be a color filter substrate or a counter substrate. The electrode layer 250 may be a pixel electrode. The trunk 251 is in the shape of a square tetracube, and a plurality of branches 252 are located inside the trunk 251 of the square tetracube shape. At this time, the groove 231 includes a square annular shape, and a circle of the groove 231 can be arranged corresponding to the square-tetracube-shaped structure of the electrode layer 250, and the edges of the trunk 251 are arranged in the groove 231. Furthermore, groove 231 is also provided corresponding to the positions of the plurality of branches 252, and some of the branches 252 are also arranged in the groove 231 to prevent the electrode layer 250 from being scratched when the spacer 203 slides, and also to prevent the electrode layer 250 from being crushed under pressure, thereby improving the stability of the display panel 20. In addition, when the first substrate 201 is a COA substrate, grooves 231 with different depths can also be provided corresponding to different color filters, so as to improve the effect of preventing the electrode layer 250 from being damaged causing abnormal driving.

Figure 10:
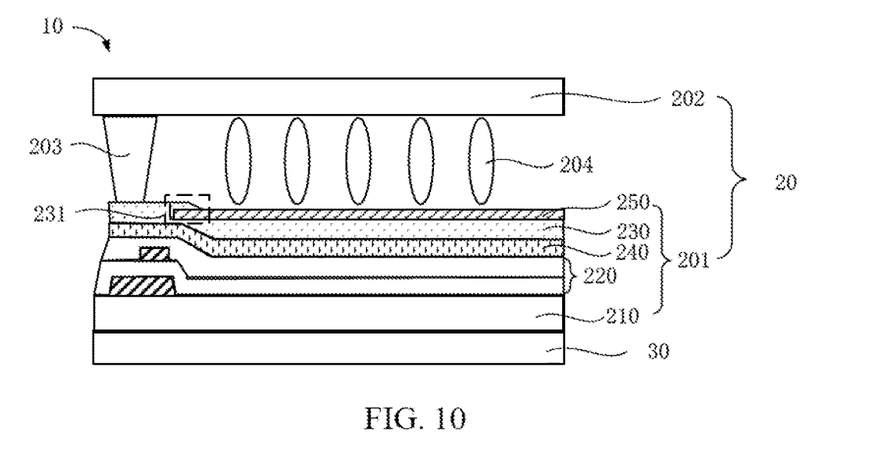
FIG. 10 is a schematic cross-sectional view of a display device of the present application.

FIG. 10 is a schematic cross-sectional view of a display device of the present application. Referring to FIG. 10, the present application further discloses a display device 10 including a backlight module 30 and any display panel 20 disclosed in the present application. The backlight module 30 is disposed on a side away from a light-emitting surface of the display panel 20.

In this embodiment, the display device 10 may be a product such as a computer, a TV, a display screen, etc. The display panel 20 in the display device 10 is a liquid crystal display panel 20. A light source is provided for the backlight module 30 to display an image. The display panel 20 adopts the display panel 20 in any of the embodiments disclosed herein, which avoids the abnormal driving phenomenon caused by the electrode layer 250 being damaged or broken due to the sliding of the spacer 203. The stability of the display panel 20 is good, which further reduces the problem of abnormal display or display failure of the display device 10, and the overall performance is stronger.

It should be noted that the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The technical solutions of the present application can be widely used in various display panels, such as TN (Twisted Nematic) display panels, IPS (In-Plane Switching) display panels, VA (Vertical Alignment) display panels, and MVA (Multi-Domain Vertical Alignment) display panels, which are all applicable to the above solutions.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A display panel, comprising a first substrate, a second substrate, and a spacer; wherein the first substrate and the second substrate are assembled together to form a cell, and the spacer is disposed between the first substrate and the second substrate;

wherein the first substrate comprises a substrate, a plurality of signal lines, a planarization layer, and an electrode layer; wherein the plurality of signal lines are arranged on the substrate and are arranged in a crisscross pattern to form a plurality of pixel regions;

wherein the planarization layer is disposed on the plurality of signal lines, wherein one end of the spacer is disposed on the second substrate, and the other end of the spacer abuts on the planarization layer;

wherein the electrode layer is disposed on the planarization layer and disposed in each of the plurality of pixel regions; wherein the electrode layer at least comprises a trunk and a plurality of branches, wherein the plurality of branches are arranged at intervals and connected to the trunk;

wherein a groove is defined in the planarization layer in a region adjacent to the spacer, and wherein the groove is disposed corresponding to the respective electrode layer, and a portion of the electrode layer in the region adjacent to the spacer is embedded in the groove;

wherein the display panel is of an in-plane switching (IPS) type, wherein the electrode layer comprises a pixel electrode and a common electrode, wherein the pixel electrode comprises a first trunk and a plurality of first branches that are arranged at intervals and connected with the first trunk in a comb-shaped structure;

wherein the common electrode comprises a second trunk and a plurality of second branches that are arranged at intervals and connected with the second trunk in a comb-shaped structure;

wherein the pixel electrode and the common electrode are arranged opposite to each other, and wherein the plurality of first branches and the plurality of second branches are alternately arranged to form a horizontal electric field;

wherein the groove is disposed corresponding to a position of the electrode layer adjacent to the respective signal line, to accommodate the portion of the pixel electrode and/or the common electrode adjacent to the respective signal line;

wherein the plurality of signal lines comprise a scan line arranged along a second direction, wherein the groove comprises at least one second elongated groove extending along the second direction, and wherein the first trunk or the second trunk is disposed in the second elongated groove;

wherein the second elongated groove comprises an elongated main groove and a plurality of sub-grooves arranged along a direction of the plurality of first branches or the plurality of second branches; wherein a length of the sub-groove is set in the range of 5 μm to 15 μm, and only portions of the branches adjacent to the trunk are arranged in the sub-grooves.

2. The display panel as recited in claim 1, wherein an opening width of the groove is smaller than a cross-sectional width of the spacer.

3. The display panel as recited in claim 1, wherein the first substrate further comprises a color filter layer disposed between the substrate and the planarization layer and corresponding to positions of the pixel regions; wherein the color filter layer comprises a plurality of color filters of different colors and comprises at least a first color filter, and wherein a thickness of the first color filter in a region adjacent to the respective signal line is greater than a thickness of the first color filter in a region away from the respective signal line;

wherein the groove comprises a first groove disposed corresponding to an edge position of the first color filter, and wherein the portion of the electrode layer is arranged in the first groove.

4. The display panel as recited in claim 1, wherein the plurality of signal lines comprise a data line arranged along a first direction, wherein the groove comprises at least one first elongated groove that extends along the first direction, and wherein at least one first branch or second branch is disposed in the at least one first elongated groove.

5. The display panel as recited in claim 1, wherein the first substrate is an array substrate, the second substrate is a color filter substrate, the groove comprises a second groove, wherein a groove wall on a side of the groove adjacent to the respective signal line is perpendicular to the array substrate; wherein a groove wall on a side of the second groove away from the respective signal line is shaped as an inclined surface or a stepped surface, and the portion of the electrode layer is disposed in the second groove.

6. The display panel of claim 1, wherein a depth of the groove is greater than a thickness of the electrode layer by 0.1 um to 0.5 um.

7. The display panel of claim 2, wherein the groove is arranged in a strip shape, and the portion of the electrode layer adjacent to the respective signal line is all arranged in the groove.

8. The display panel of claim 6, wherein the region where the groove is disposed is within a width range of 20 um adjacent to the respective signal line.

9. The display panel of claim 1, wherein widths of the main groove and the plurality of sub-grooves are both set to be less than a cross-sectional width of the spacer.

10. The display panel of claim 1, wherein at the position corresponding to the groove, an opening width of the groove along the extending direction of the plurality of signal lines is set to be greater than a width of the electrode layer.

11. The display panel of claim 10, wherein a difference between the width of groove and the width of the electrode layer lies in the range of 2 um to 15 um.

12. The display panel of claim 3, wherein the groove is only defined in the color filter that is formed last.

13. The display panel of claim 4, wherein the first elongated groove is defined only at a position adjacent to the respective scan line.

14. The display panel of claim 1, wherein of the pixel electrode and the common electrode, each of the plurality of first branches comprises a first sub-branch and a second sub-branch; wherein one end of the first sub-branch is connected to the first trunk, and another end of the first sub-branch is connected to the second sub-branch; and wherein the first sub-branch and the second sub-branch are arranged at a first obtuse angle;

wherein each of the plurality of second branches comprises a third sub-branch and a fourth sub-branch; wherein one end of the third sub-branch is connected to the second trunk, and another end of the third sub-branch is connected to the fourth sub-branch; and wherein the third sub-branch and the fourth sub-branch are arranged at a second obtuse angle;

wherein the first obtuse angle is equal to the second obtuse angle, wherein the first obtuse angle is set to take a value that lies in the range of 150° to 166°.

15. A display device comprising a backlight module and comprising a display panel, wherein the backlight module is arranged on a side away from a light emitting surface of the display panel;

wherein the display panel comprises a first substrate, a second substrate, and a spacer; wherein the first substrate and the second substrate are assembled together to form a cell, and the spacer is disposed between the first substrate and the second substrate;

wherein the first substrate comprises a substrate, a plurality of signal lines, a planarization layer, and an electrode layer; wherein the plurality of signal lines are arranged on the substrate and are arranged in a criss-cross pattern to form a plurality of pixel regions;

wherein the planarization layer is disposed on the plurality of signal lines, wherein one end of the spacer is disposed on the second substrate, and the other end of the spacer abuts on the planarization layer;

wherein the electrode layer is disposed on the planarization layer and disposed in each of the plurality of pixel regions; wherein the electrode layer at least comprises a trunk and a plurality of branches, wherein the plurality of branches are arranged at intervals and connected to the trunk;

wherein a groove is defined in the planarization layer in a region adjacent to the spacer, and wherein the groove is disposed corresponding to the respective electrode layer, and a portion of the electrode layer in the region adjacent to the spacer is embedded in the groove;

wherein the display panel is of an in-plane switching (IPS) type, wherein the electrode layer comprises a pixel electrode and a common electrode, wherein the pixel electrode comprises a first trunk and a plurality of first branches that are arranged at intervals and connected with the first trunk in a comb-shaped structure;

wherein the common electrode comprises a second trunk and a plurality of second branches that are arranged at intervals and connected with the second trunk in a comb-shaped structure;

wherein the pixel electrode and the common electrode are arranged opposite to each other, and wherein the plurality of first branches and the plurality of second branches are alternately arranged to form a horizontal electric field;

wherein the groove is disposed corresponding to a position of the electrode layer adjacent to the respective signal line, to accommodate the portion of the pixel electrode and/or the common electrode adjacent to the respective signal line;

wherein the plurality of signal lines comprise a scan line arranged along a second direction, wherein the groove comprises at least one second elongated groove extending along the second direction, and wherein the first trunk or the second trunk is disposed in the second elongated groove;

wherein the second elongated groove comprises an elongated main groove and a plurality of sub-grooves arranged along a direction of the plurality of first branches or the plurality of second branches; wherein a length of the sub-groove is set in the range of 5 um to 15 um, and only portions of the branches adjacent to the trunk are arranged in the sub-grooves.

* * * * *